United States Patent [19]
Potter et al.

[11] Patent Number: 5,822,556
[45] Date of Patent: Oct. 13, 1998

[54] DISTRIBUTED COMPLETION CONTROL IN A MICROPROCESSOR

[75] Inventors: Terence Matthew Potter; Michael Thomas Vaden; Christopher Hans Olson, all of Austin, Tex.

[73] Assignee: International Business Machines Corporation, Armonk, N.Y.

[21] Appl. No.: 840,807

[22] Filed: Apr. 16, 1997

Related U.S. Application Data

[63] Continuation of Ser. No. 377,813, Jan. 25, 1995, abandoned.

[51] Int. Cl.$^6$ ................................................ G06F 9/28
[52] U.S. Cl. ................................................ 395/381
[58] Field of Search ........................... 395/800, 376, 395/377, 381, 391, 392, 580

[56] References Cited

U.S. PATENT DOCUMENTS

| | | | |
|---|---|---|---|
| 4,149,243 | 4/1979 | Wallis | 395/676 |
| 4,635,186 | 1/1987 | Oman et al. | 395/182.08 |
| 4,740,895 | 4/1988 | Sargent et al. | 395/183.01 |
| 4,762,253 | 8/1988 | Bluhm et al. | 395/383 |
| 4,903,196 | 2/1990 | Pomerene et al. | 395/375 |
| 4,991,090 | 2/1991 | Emma et al. | 395/185.03 |
| 5,127,104 | 6/1992 | Dennis | 395/650 |
| 5,151,981 | 9/1992 | Westcott et al. | 395/375 |
| 5,201,056 | 4/1993 | Daniel et al. | 395/800 |
| 5,497,499 | 3/1996 | Garg et al. | 395/800 |

FOREIGN PATENT DOCUMENTS

| | | | |
|---|---|---|---|
| 378415A | 7/1990 | European Pat. Off. | G06F 9/38 |
| 606643A | 7/1994 | European Pat. Off. | G06F 9/38 |

OTHER PUBLICATIONS

Lingtao Wang and Chuan–lin Wu, "Distributed Instruction Set Computer Architecture", IEEE Transactions on Computers, vol. 40, No. 8, pp. 915–933, Aug. 1991.

Keith Diefendorff and Michael Allen, Organization of the Motorola 88110 Superscalar RISC Microprocessor, IEEEMicro, No. 2, pp. 40–63, Apr. 12, 1992.

*Primary Examiner*—David Y. Eng
*Attorney, Agent, or Firm*—Sawyer & Associates; Mark E. McBurney

[57] ABSTRACT

A distributed completion control system for a microprocessor is disclosed. The system comprises a plurality of dispatch units, each of the dispatch units further comprises a dispatch queue responsive to a fetched address for receiving instructions; a plurality of control dependent tags; and means for indicating that the control dependent tags have been assigned to the appropriate instructions. The system further includes a plurality of execution units for receiving the instructions and the control dependent tags.

18 Claims, 8 Drawing Sheets

DISTRIBUTED COMPLETION CONTROL IN A MICROPROCESSOR

This application is a continuation of application Ser. No. 08/377,813 filed on Jan. 25, 1995 now abandoned.

FIELD OF THE INVENTION

The present invention relates generally to microprocessors and more particularly to the control of the completion of instructions in such processors.

BACKGROUND OF THE INVENTION

Handling control dependencies is a large portion of the logic and complexity of many microprocessors. Often a microprocessor will have many mechanisms for handling control dependencies and when different levels of interrupt precision are required (e.g. floating point exceptions enabled/disabled) these mechanism must function significantly differently resulting in difficult control. For instance, when a RISC processor enters a floating point exceptions enabled mode, the processor must start issuing instructions one at a time (resulting in a performance degradation), thus the completion requirements of that mode significantly affect the dispatch logic of the processor.

In another processor, floating point instructions are always completed in-order with other instructions—resulting in overly conservative synchronization in the completion logic (i.e., it behaves as if it is always in floating point exceptions enabled mode). With the completion buffer approach, completing a large number of instructions in a single cycle is infeasible due to the serializing nature of a queue structure (e.g. to know if instruction 2 is going to complete, one must first know if instructions 0 and 1 are going to complete).

Related to completion logic is purging logic. When an instruction completes, there is a correct control-flow decision and an incorrect control-flow decision. This is true for branches, but also true for any instruction which can cause an exception (i.e., there is an exception path and a no exception path). Although they have been treated differently in the past, as far as control-flow management goes, (synchronous) exceptions, (asynchronous) interrupts, and branches are all very similar.

Accordingly, a conventional completion control system includes a centralized controller which includes a centralized control queue for receiving all of the instructions. The instructions as they were executing would send information out to the control queue. The centralized control queue would then determine the proper order for the execution of instructions. The centralized control queue can be a significant bottleneck for the execution of the program because of the number of different activities that must be controlled. Accordingly, the overall performance of the microprocessor will decrease significantly as the number of control dependencies increase.

Hence, it is important to provide a system which these control dependencies are handled in a more efficient manner. The system should be one which does not add complexity to the microprocessor. Finally, the system should be one in which can be easily implemented within existing microprocessor designs. The present invention addresses such a need.

SUMMARY OF THE INVENTION

Distributed completion is a method of controlling the completion of instructions such that the number of instructions allowed to complete at once can be large (without a timing burden), and all forms of control dependencies are handled through a single coherent mechanism.

A distributed completion control system for a microprocessor is disclosed. The system comprises a plurality of dispatch units, each of the dispatch units further comprises a dispatch queue responsive to a fetched address for receiving instructions; a plurality of control dependence tags; and means for indicating that the control dependence tags have been assigned to the appropriate instructions. The system further includes a plurality of execution units for receiving the instructions and the control dependence tags.

The distributed completion mechanism maintains complex control dependence relations between instructions in a superscalar processor without the cycle time burden associated with large sequential queue structures.

DESCRIPTION OF THE INVENTION

The present invention relates to a completion control system that is utilized to control the movement of instructions within a microprocessor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

For purposes of this example, a general superscalar processor is assumed, with a sea of execution units, and multiple dispatchers feeding them. This is not necessarily a coherent design point (e.g., dispatch complexities are ignored associated with multiple dispatchers), but rather a theoretically possible machine which incorporates many features found in different design points. It is also assumed that the multiple dispatchers are used to fetch multiple code segments within a single thread—in other words, there are commission ordering requirements between dispatchers. Finally, it can be assumed that the granularity of the code segments which can be split between dispatchers is at the basic block level and that there is a partial ordering of dispatchers with the control-dependence relation.

Figure 1:
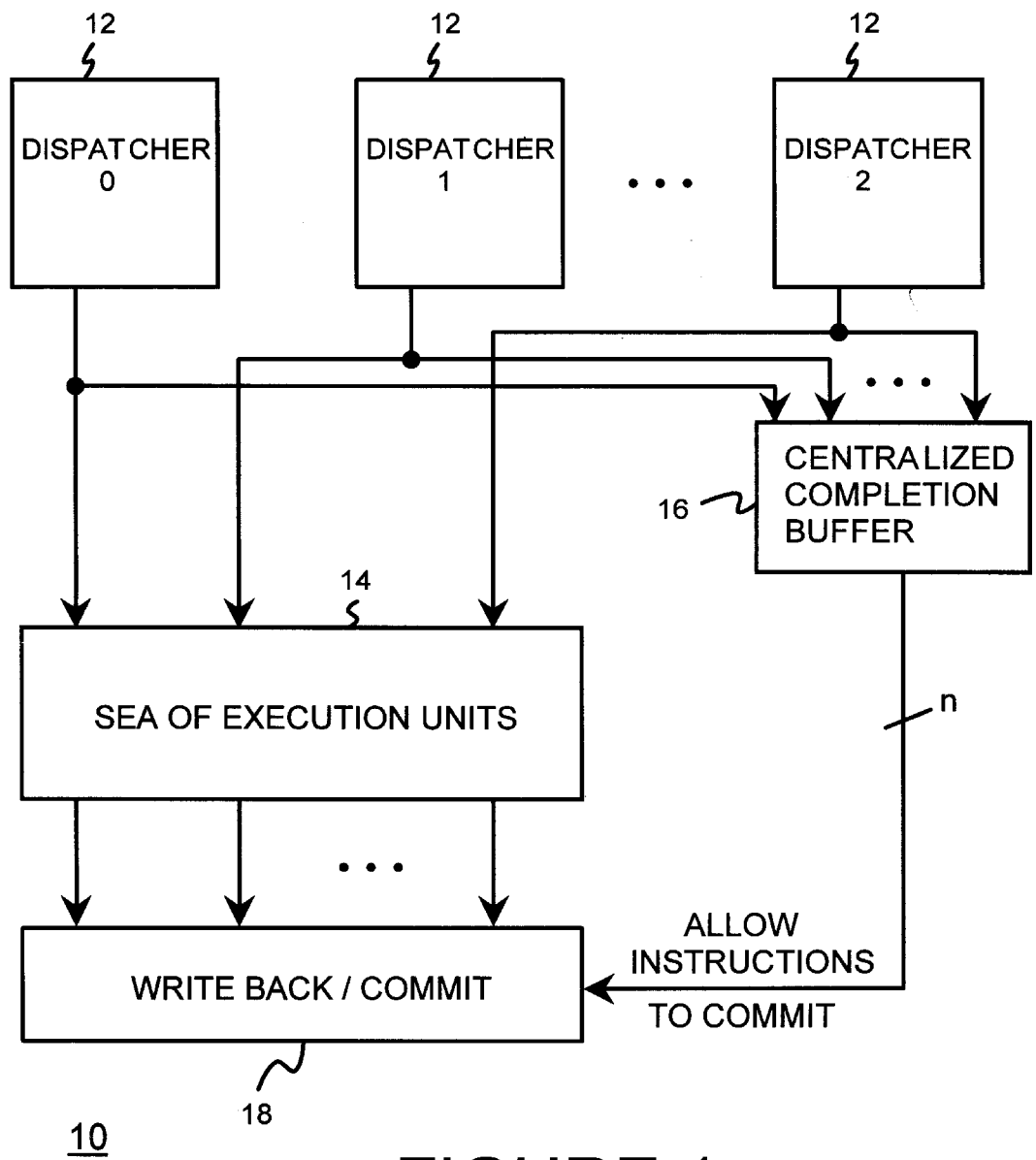
FIG. 1 is a block diagram of a conventional completion control system for a microprocessor.

FIG. 1 is a block diagram of a conventional completion control system 10 in accordance with the above assumption that could be utilized in a microprocessor. The completion control system 10 of FIG. 1 includes a plurality of dispatch units 12 for receiving instructions. Each of those dispatch units 12 then dispatches instructions to its appropriate execution unit. In this embodiment the execution units are shown as a sea of execution units 14 in which the dispatchers can provide signals thereto. In addition, each of the dispatch units 12 are also coupled to a centralized completion buffer 16. The sea of execution units 14 as well as the centralized completion buffer 16 provide signals to the writeback commit logic 18. The centralized completion buffer 16 provides a signal to allow instructions to commit to a particular action. One of the common features of conventional completion mechanisms is that completion was thought of as the act of resolving control flow and committing an instruction. In this embodiment, the throughput of the instructions is limited by the rate at which instructions can be removed from the centralized completion buffer. As microprocessors have become faster and require the processing of more instructions per cycle this bottleneck in throughput can create significant disadvantages in the processing of such instructions.

Figure 2:
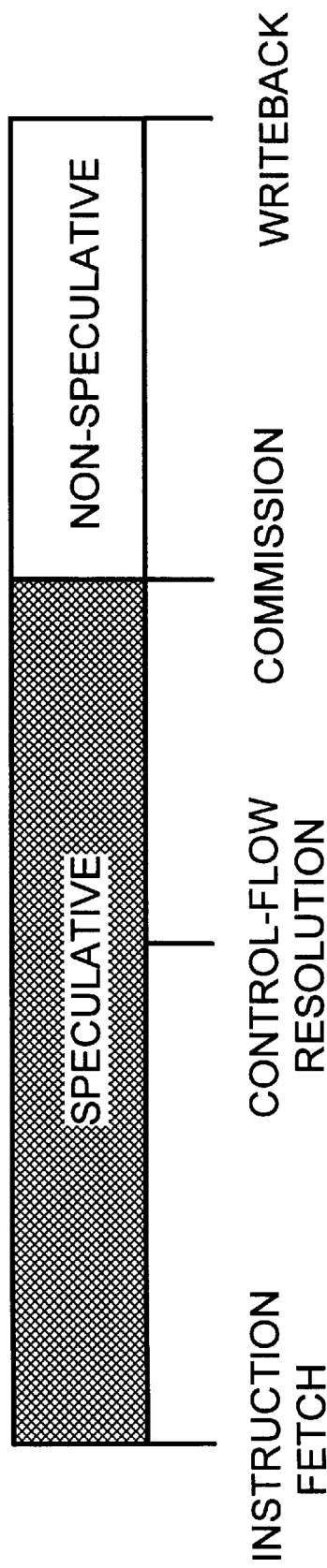
FIG. 2 is a table showing control flow resolution in a microprocessor.

Referring now to FIG. 2, what is shown is a table that represents the lifetime of an instruction in a processor. As can be seen there are two states in which the instruction can be, that is speculative and non-speculative. Note that control-flow resolution is separate from commission. Control-flow resolution occurs when an instruction determines which possible control path it is going to take (e.g., which way a branch goes, whether or not a load is going to interrupt. Note that this occurs independent of instructions upon which this instruction control depends.

For the purposes of this specification, an instruction B is control-flow-dependent on instruction A if there is a control-flow decision which A can make such that an architectural state change caused by B is not architecturally correct. Note that, in general, the control-dependence relation depends on a machine state. Commission occurs after an instruction is guaranteed to execute. When the processor determines that an instruction is going to execute, it commits that instruction, meaning that it is allowed to update architected registers. This commit-point is the division between speculative and non-speculative execution. After an instruction has been committed, it cannot be purged.

In a distributed control completion system in accordance with the present invention, a unique completion tag is assigned to each instruction at dispatch-time. Additionally, an instruction is associated with a list of code completion tags corresponding to the list of instructions upon which it control-depends. When an instruction resolves its control flow decisions, it sends its tag to all instructions, as either a purge or resolve indicator. If an instruction receives a purge indicator for an instruction upon which it control-depends, then it purges itself. If an instruction receives a resolve indicator for an instruction upon which it control-depends, then it marks that instruction as resolved. When an instruction's control dependencies are all resolved, it can commit. In this way, instructions can commit without ever having to poll a centralized completion unit.

Through the use of a plurality of dispatch unit in accordance with the present invention, the completion requirements of a given instruction can be changed within a processing unit design and the completion interface to other units should remain stable (e.g. if a floating point unit design has a timing problem control-flow-resolving an instruction in the multiply stage, it can simply move the resolution point to the next cycle—all interlocks are already in place, so no other units are affected (of course performance would be affected).

Figure 3:
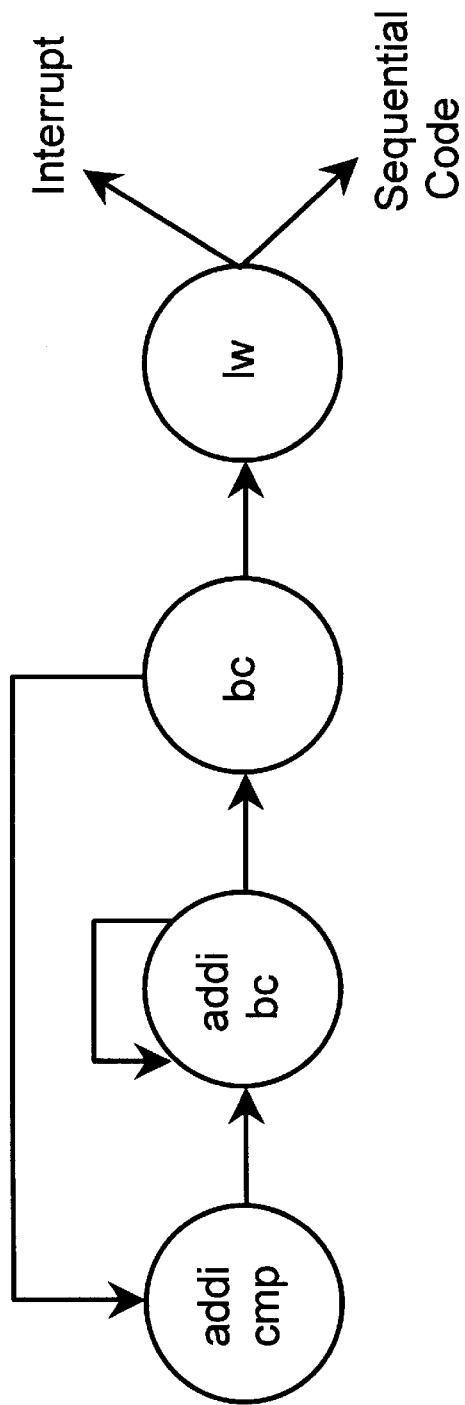
FIG. 3 is a program code which can be represented in a control-flow graph format.

FIG. 3 shows a program code which can be represented in a control-flow graph format which explicitly shows pieces of the code basic blocks as nodes and then connects the nodes wherever a piece of code can immediately follow another piece of code. What has been discovered is that a new dispatch unit can be used when an instruction has multiple output edges. Control flow information can then be utilized by the processor to determine the appropriate path.

Figure 4:
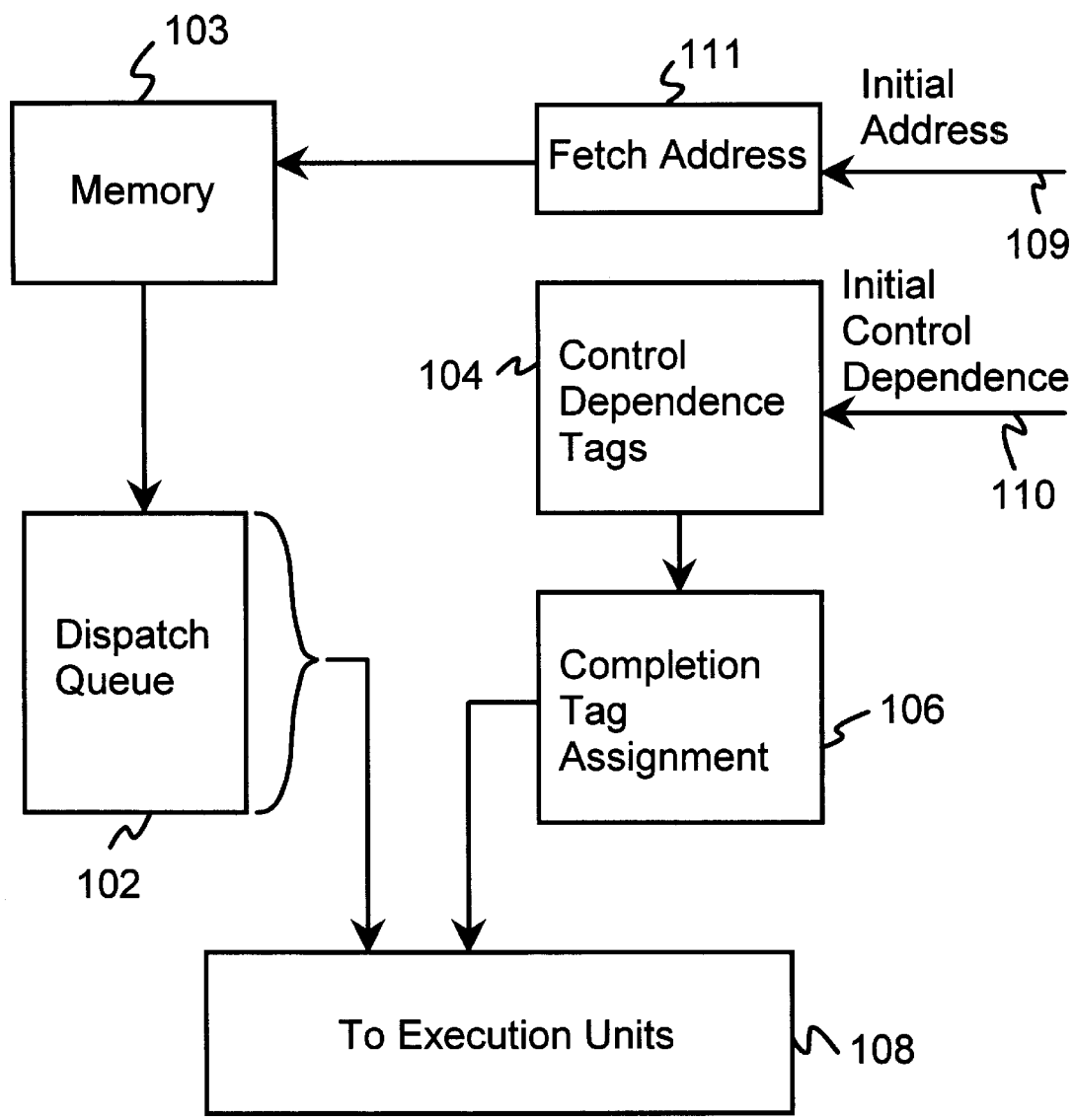
FIG. 4 is a simple block diagram of a dispatch unit in accordance with the present invention.

FIG. 4 is a simple block diagram of a dispatch unit 100 in accordance with the present invention. The dispatch unit 100 comprises a dispatch queue 102 for receiving instructions from a memory 103 dependent upon a fetch address, a control dependence tag 104 and an completion tag assignment 106. The instructions and their corresponding control dependence information is provided to execution units 108. Each dispatch unit 100 will have its own range of control dependence tags 100 which are assigned to a particular instruction. This allows each of the dispatch units 100 to manage the application and deallocation of their own completion tags without communication to any centralized unit.

When the processor decides to pursue multiple paths from an instruction, then it initializes at least one new dispatch unit 100 with the address to start fetching from and the control dependence tag 104 for the first instruction in that path. Other dispatch units 100 are initialized if more than two paths are pursued (note that the original dispatch unit 100 can pursue one of the two paths). Once a dispatch unit 100 has been initialized, it can process its code path until it is finished—at which point it can be reallocated for another path. A dispatch unit 100 is considered finished once the path it is fetching is purged and there are no instructions left in its dispatch queue.

As is seen in FIG. 4, when a dispatch unit 100 is initialized, it is given an initial address 109, and an initial control dependency tag 110. The fetch address 111 specifies the starting address for the code path which this dispatch unit 100 is to process. The initial control dependence tag 110 is the control dependence tag for the instruction at the initial address 109. There are a number of ways to implement the completion tag allocation logic shown in FIG. 4. One such way will be described below.

Figure 5:
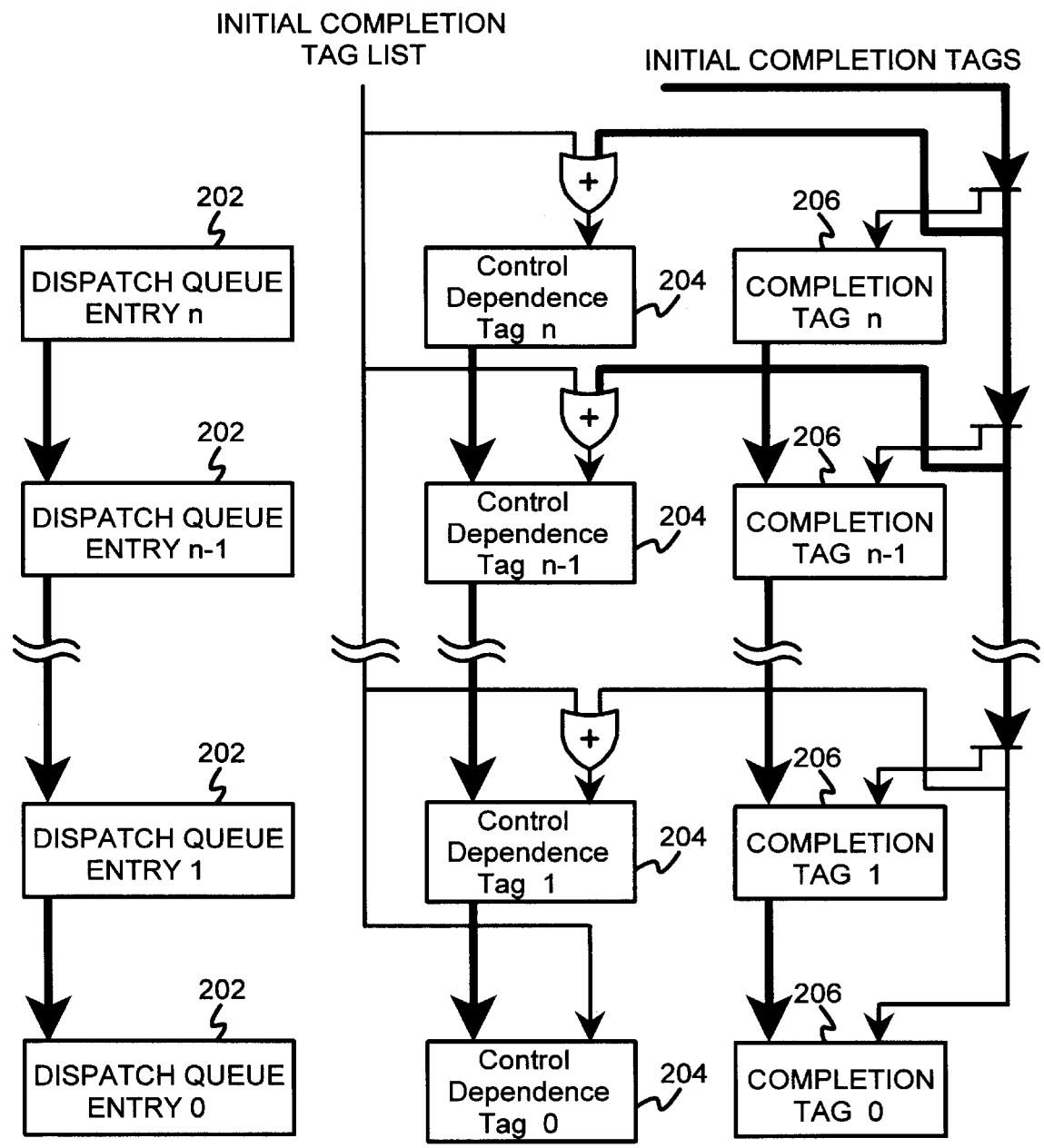
FIG. 5 is a detailed block diagram of the dispatch unit of FIG. 4 in accordance with the present invention.

Referring now to FIG. 5 what is shown is a detailed block diagram of the dispatch unit 100. It is assumed that instructions are assigned completion tags as they are put into the dispatch queue 202. If a tag cannot be assigned to a given instruction, then that instruction cannot be dispatched (until a tag can be allocated for it). The logic for actually determining which tags to allocate can be some decode logic—the first available tag is found and allocated to the first instruction coming into the dispatch queue 202, the second available tag is assigned to the second instruction.

Each of the completion tags 206 and control dependence tags 204 are assigned together in order to make it easier to find which tags to allocate. Assuming a set of tags have been allocated, then generating the control dependence list and control dependence tags is simply a matter of combining the tags which have been assigned with the tags which have been allocated.

As is seen, as the dispatch queue 202 processes instructions, it allocates its ordered control-dependence tags 204 and ordered completion tag 206 to the corresponding instruction. The control-dependence tags 204 are $2^K$ bits assuming that each of the completion tags 206 are k bits. In addition, the number of instructions that can exist per machine is $2^K$ between dispatch and the commit. In a preferred embodiment, one control dependence tag 204 is assigned to each instruction at dispatch time. When an instruction is dispatched, its completion tag 206 and a list of the completion tags (control dependence tags 206) corresponding to the instructions upon which it control-depends are dispatched with it. Accordingly, if there are a total of n distinct completion tags 206 available to each of m dispatch units, then the list of control dependencies for an instruction consists of an n x m bit bus with a one signifying the existence of a control-dependency and a zero indicating the lack of a control-dependency.

Accordingly, the completion tag 206 for an instruction is either a n x m bit bus with precisely one bit on (signifying the tag assigned to that instruction), or an encoded point to one of the n x m control tags. The execution units signify control-dependence resolution on one of two global bit-wise tri-state busses. One bus is used to signify correct resolution (the resolution bus), while the other indicates that any instructions depending on that instruction should be purged (the purge bus). When an instruction results in multiple control-dependent paths, then each path is given a unique tag.

Each pipeline stage is responsible for monitoring the resolution and purge busses of the microprocessor. If a tag is put onto the resolution bus, then each stage looks at its current control-dependence tag 204 (associated with the instruction currently at that stage), and if the control dependence tag 204 is present then it must be removed from the list (the control dependency is resolved). Thus when the list of control dependence tags 204 for an instruction is empty (zero), then the instruction can be committed.

Figure 6:
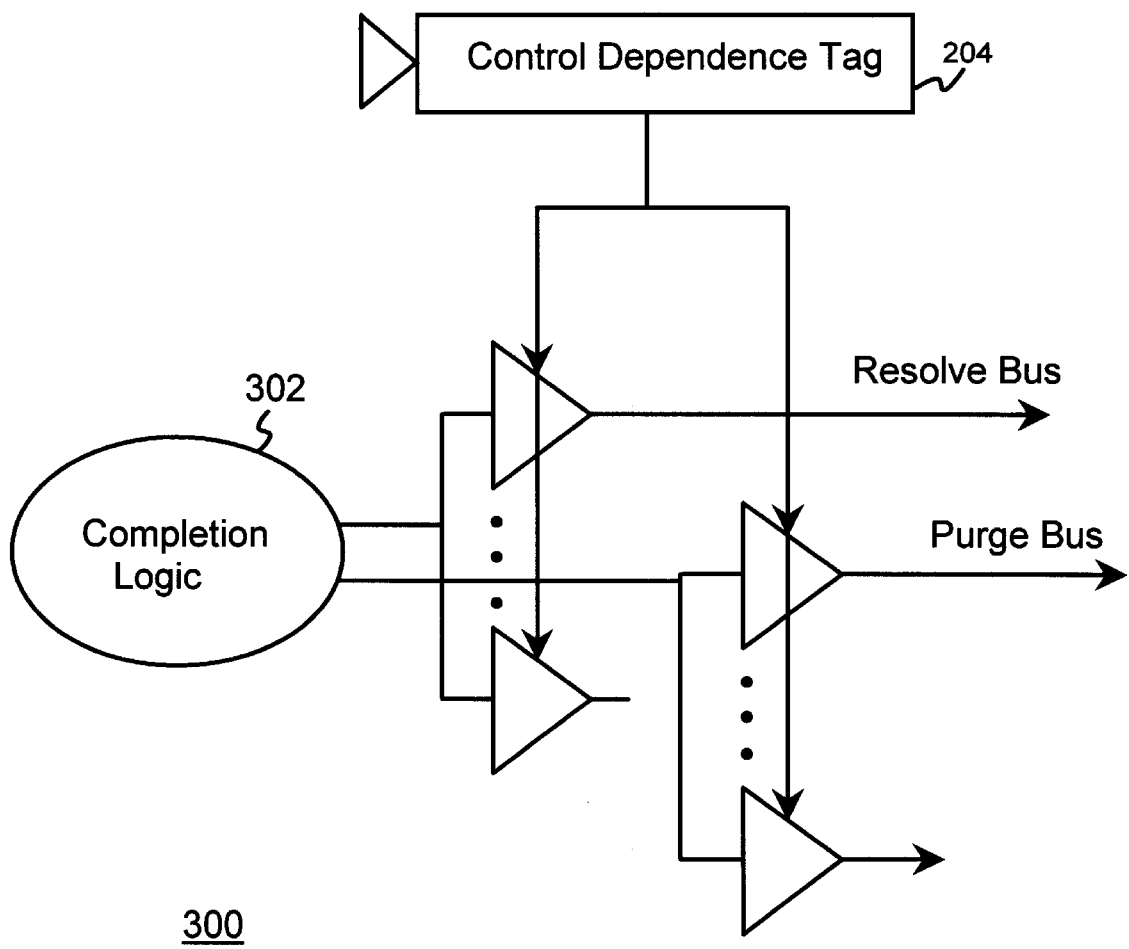
FIG. 6 is a block diagram of a logic circuit which can resolve control dependence information for use with the dispatch unit in accordance with the present invention.
Figure 7:
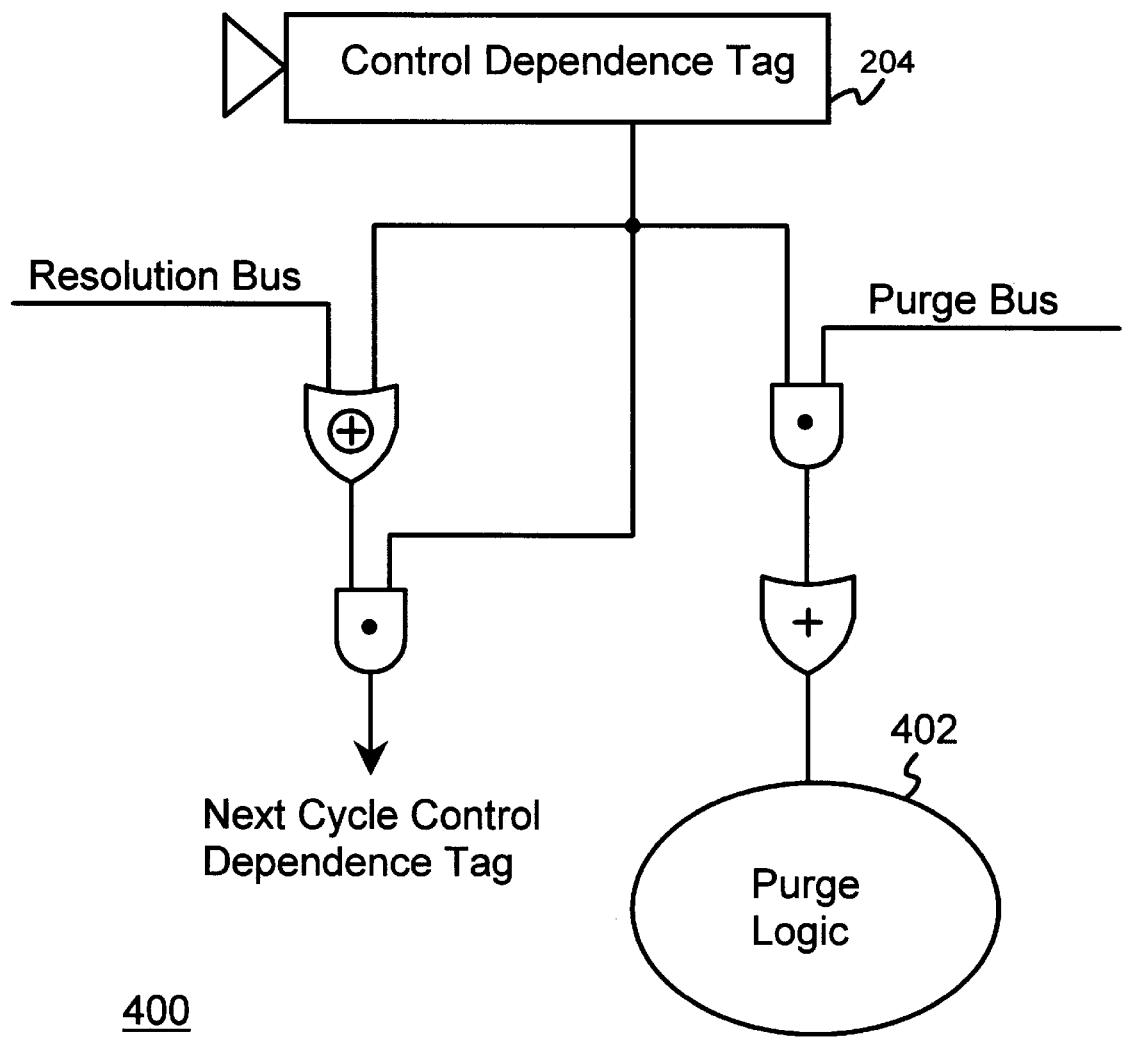
FIG. 7 is a block diagram of a logic circuit that includes purge logic for use in a dispatch unit in accordance with the present invention.
Figure 8:
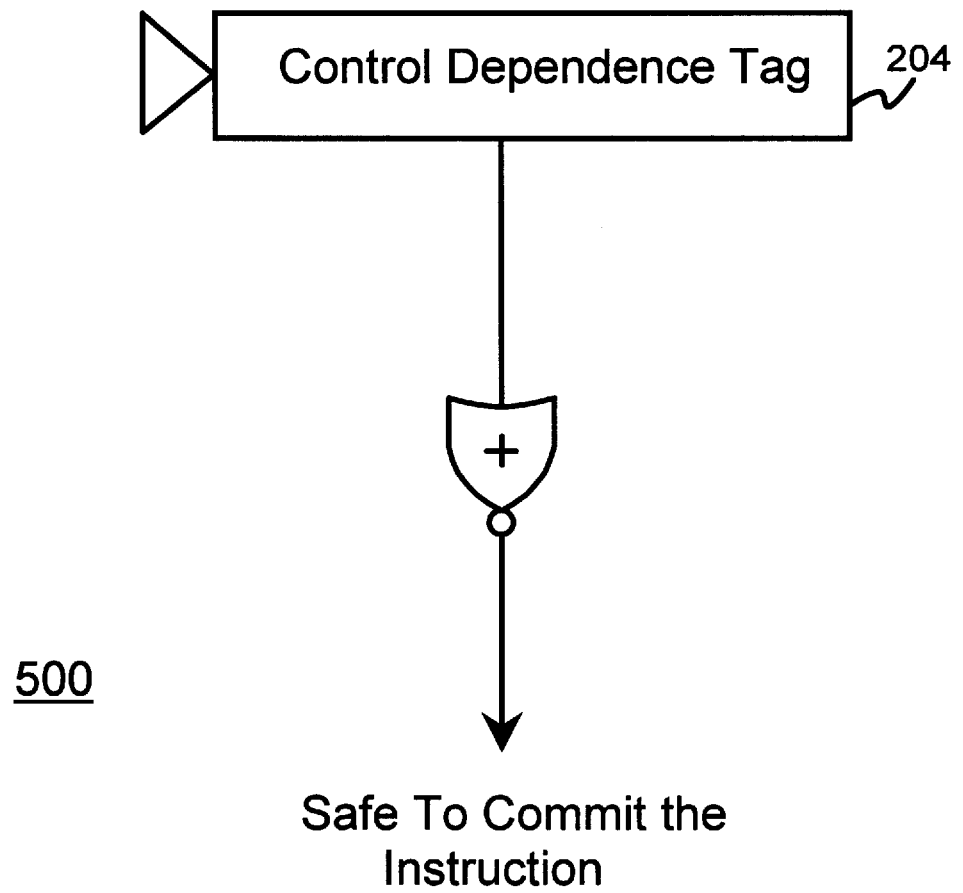
FIG. 8 is a block diagram of a logic circuit utilized to update architected registers for use in a dispatch unit in accordance with the present invention.

If a control dependence tag 204 is placed on the purge bus, then each stage looks at its control-dependence tag list, and if that control dependence tag 204 is present, then it suppresses the output of its instruction (possibly by purging it). If a stage is capable of resolving an instruction then it uses its current control-dependence tag 204 (the unique control dependence tag 204 assigned to the instruction currently residing at that stage), to enable the tri-state driver onto that bit of the resolution and purge busses, and outputs the appropriate values. FIGS. 6–8 show various types of circuitry utilized for the various pipeline stages.

FIG. 6 is a block diagram of a logic circuit 300 which can resolve control dependence information that includes a completion logic circuit 302 for use with the dispatch unit 100 in accordance with the present invention.

FIG. 7 is a block diagram of a logic circuit 400 that includes purge logic 402 for use in a dispatch unit 100 in accordance with the present invention.

FIG. 8 is a block diagram of a logic circuit 500 utilized to update registers for use in a dispatch unit 100 in accordance with the present invention.

All of the logic circuits 300, 400 and 500 are duplicated at every stage and take up very little area in the circuit. The completion logic and the purge logic shown in FIGS. 6–8 are required for other completion schemes and therefore are depicted simply as a logic bubbles. Typically, the purge logic 402 provides a signal which resets state machines and degates a valid instruction signal of some sort. The completion logic 502 determines which direction a control instruction will take and is required in any processor.

Finally, it should be understood that the logic circuits 300, 400 and 500 are merely representative of the types of logic circuits that can be utilized in the various pipeline stages. Accordingly, one of ordinary skill in the art will readily recognize that a variety of logic circuits could be utilized with a system in accordance with the present invention and their use would be within the spirit and scope of the present invention.

Accordingly, a system in accordance with the present invention provides a completion control scheme which is distributed. This is accomplished by providing control dependence information with the instructions and therefore, a centralized completion control is not required. Accordingly, each of the dispatch units contain the necessary information as to whether the unit should commit or purge the instruction.

The distributed completion system in accordance with the present invention maintains complex control dependence relations between instructions in a superscalar processor without the cycle time burden associated with large sequential queue structures. The cost of this completion control mechanism is a large number of tag bits associated with each instruction stage, however, in light of shrinking lithography this cost is small and takes advantage of the strengths of newer technologies.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A distributed completion control system for a microprocessor comprising:

a plurality of dispatch units;

each of the dispatch units comprising a dispatch queue responsive to a fetched address for receiving instructions;

means for assigning a unique completion tag to each instruction, the completion tag assigning means being included in at least one of the dispatch units;

means for providing control dependence information with regard to the instructions, the providing means being included in at least one of the dispatch units;

means for associating a first instruction with a list of completion tags corresponding to a list of instructions upon which the first instruction control-depends, the associating means being included in at least one of the dispatch units;

means for assigning control dependence information to appropriate instructions, the control dependence assigning means being included in at least one of the dispatch units;

means for sending a second instruction's tag to each instruction as an indicator to either purge or resolve when the second instruction resolves its control flow decisions, the sending means being coupled to at least one of the dispatch units; and a plurality of execution units for receiving the instructions and the associated control dependence information and for allowing each dispatch unit to commit instructions dependent on the control dependence information.

2. The distributed completion control system of claim 1 in which the control dependence information comprises a plurality of ordered completion tags and a plurality of ordered control dependence tags.

3. The distributed completion control system of claim 2 in which the dispatch queue comprises a plurality of dispatch queue units that receives the instructions in a ordered manner.

4. The distributed completion control system of claim 3 in which the plurality of ordered completion tags and the plurality of ordered control dependence tags correspond to the ordered instructions such that the appropriate control dependent information is provided.

5. The distributed completion control system of claim 1 in which the control dependence information is utilized to commit the instruction.

6. The system of claim 1 wherein the plurality of execution units signify control-dependence resolution on at least one bus.

7. The system of claim 1, wherein if the first instruction receives a purge indicator for an instruction upon which it control-depends, then the first instruction purges itself.

8. The system of claim 1, wherein if the first instruction receives a resolve indicator for an instruction upon which it control-depends, then the instruction upon which it control-depends is marked as being resolved.

9. The system of claim 8, wherein when control dependencies of the first instruction is resolved, the first instruction can commit.

10. A dispatch unit for use in a processor comprising:
  a dispatch queue for receiving instructions;
  a unique completion tag assigned to each instruction received in the dispatch queue;
  control dependence tag means for providing control dependence information with regard to the instructions received in the dispatch queue;
  a list of completion tags corresponding to a list of instructions upon which the first instruction control-depends, wherein the list of completion tags are associated with a first instruction;
  completion tag assignment means for assigning the control dependence information to the appropriate instructions; and
  sending means for sending a second instruction's tag to each instruction as an indicator to either purge or resolve when the second instruction resolves its control flow decisions.

11. The dispatch unit of claim 10 in which the control dependence information comprises a plurality of sequentially ordered completion tags and a plurality of sequentially ordered control dependence tags.

12. The dispatch unit of claim 11 in which the dispatch queue comprises a plurality of dispatch queue units that receives the instructions in a ordered manner.

13. The dispatch unit of claim 12 in which the plurality of control dependence ordered completion tags and the plurality of ordered control dependence tags correspond to the ordered instructions such that the appropriate control dependent information is provided.

14. The dispatch unit of claim 10 in which the control dependence information is utilized to commit the instruction.

15. A method for dispatching instructions in a processor comprising:
  (a) receiving instructions in a dispatch queue;
  (b) assigning a unique completion tag to each instruction received in the dispatch queue;
  (c) providing control dependence information with regard to the instructions received in the dispatch queue;
  (d) providing a list of completion tags corresponding to a list of instructions upon which the first instruction control-depends, wherein the list of completion tags are associated with a first instruction;
  (e) assigning the control dependence information to the appropriate instructions; and
  (f) sending a second instruction's tag to each instruction as an indicator to either purge or resolve when the second instruction resolves its control flow decisions.

16. The method of claim 15, wherein if the first instruction receives a purge indicator for an instruction upon which it control-depends, then it purges itself.

17. The method of claim 15, wherein if the first instruction receives a resolve indicator for an instruction upon which it control-depends, then that instruction is marked as being resolved.

18. The system of claim 17, wherein when control dependencies of the first instruction is resolved, the first instruction can commit.

* * * * *